E. C. SMITH & A. WATERHOUSE.
APPARATUS FOR EXTRACTING WAX.
APPLICATION FILED MAR. 28, 1908.
922,637.
Patented May 25, 1909.
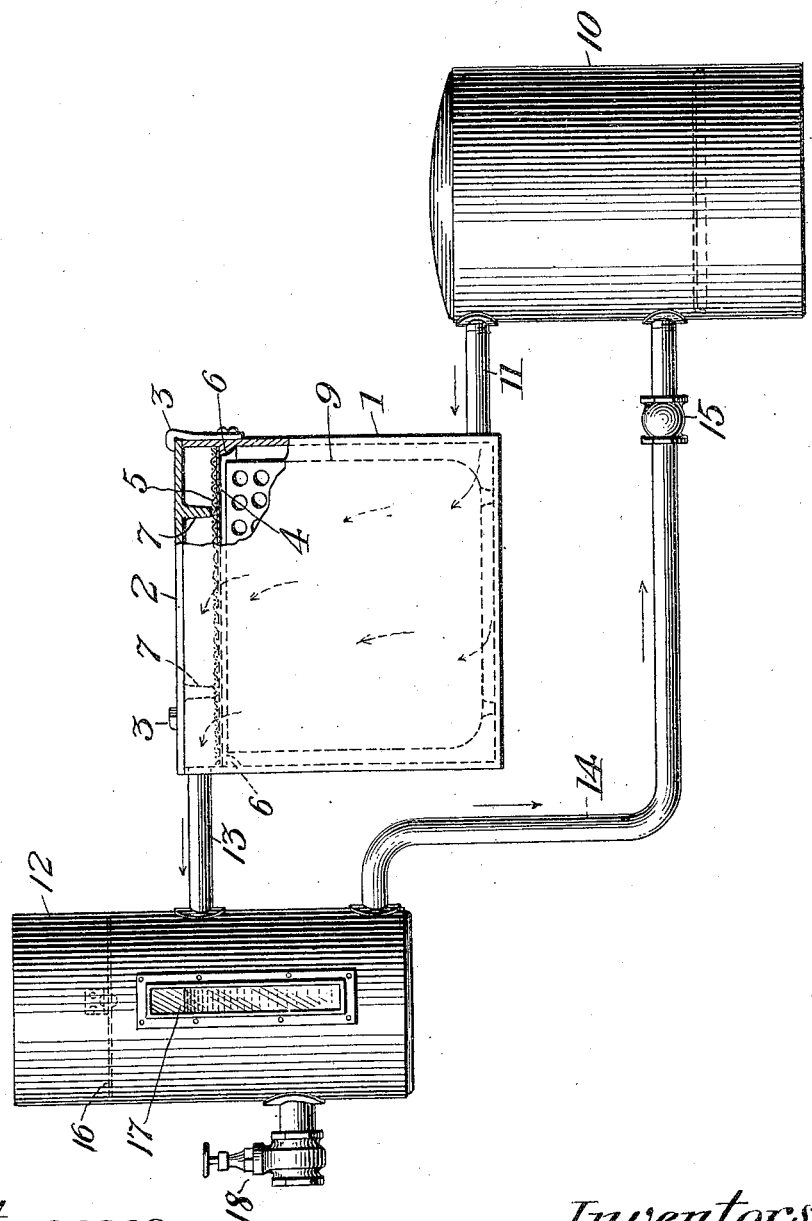

UNITED STATES PATENT OFFICE.

EPHRAIM C. SMITH AND ALBERT WATERHOUSE, OF PEARL CITY, TERRITORY OF HAWAII.

APPARATUS FOR EXTRACTING WAX.

No. 922,637.   Specification of Letters Patent.   Patented May 25, 1909.

Application filed March 28, 1908. Serial No. 423,900.

*To all whom it may concern:*

Be it known that we, EPHRAIM C. SMITH and ALBERT WATERHOUSE, citizens of the United States, residing at Pearl City, county of Oahu, Territory of Hawaii, have invented a new and useful Apparatus for Extracting Wax, of which the following is a specification.

Our invention relates to an apparatus for extracting wax from honeycombs, separating the wax from the dirt and slum gum (the residue of propolis, cocoons etc. after the beeswax is extracted from honeycombs); and has for its object to produce a more efficient apparatus than has hitherto been employed.

This invention contemplates a closed container in which a charge of honeycomb is placed, screens or strainers in said container above said charge, and an upward circulation of hot water through and agitating the charge, melting and carrying the wax over into a receiver or trap, the slumgum, dirt and other refuse being retained in the container, from which it is then removed, and the process repeated. It is also contemplated employing the apparatus for the cleaning of wax from which the slumgum has been removed, and for similar purposes.

This specification is a specific description of one form of the invention, while the claims are definitions of the actual scope thereof.

Reference is to be had to the accompanying drawing, forming a part of this specification, showing in elevation one form of apparatus employed in our process.

1 represents a container provided with a removable cover 2 which may be tightly closed by clamps or latches 3. A removable screen 4 and a strainer 5, of filter cloth or other suitable material, fit the inside of the container 1, and rest upon the ledge 6, and are prevented from lifting by the projections 7 from the cover 2 when said cover is in place. The charge of honeycombs is placed in the container 1 below the screen 4, preferably in a perforated basket 9 as the charge can thus be quickly placed in the container and the refuse and slumgum easily removed thereby from the container.

Water heated in a heater 10 enters near the bottom of the container 1, through the pipe 11, and rises through the charge of honeycomb, melting and carrying the wax through the screen 4 and strainer 5 and passing into the trap or receiver 12 through the pipe 13 near the top of the container. The cooler water passes from the bottom of the receiver 12 through the pipe 14 and check valve 15 into the heater 10. The direction of circulation is shown by arrows. The receiver 12 is preferably open at the top and provided with a splash plate 16 and a window 17. The wax floats on the water in the receiver 12 and may be drawn off through the gate 18.

We claim:—

1. An apparatus for extracting wax comprising, a container for the material to be treated, a removable cover for the container, a receiver for the wax, a pipe connecting the upper portion of the container with said receiver, a water heater and circulating pipes connecting the lower portions of the container and receiver with the water heater.

2. In an apparatus for extracting wax, a container provided with a strainer support near its upper end, a removable cover having depending projections, and a strainer resting on said support independent of and held down by said projections, an outlet being provided above the strainer.

3. An apparatus for extracting wax, comprising a container provided with a strainer, a water heater connected at its upper portion with the lower end of the container, a receiver for the wax, a pipe connecting the container above the strainer with said receiver, and a return pipe connecting the lower portion of the receiver with the lower portion of the water heater.

4. An apparatus for extracting wax consisting of a container provided with a removable cover, a strainer therebelow and a removable receptacle under the strainer, a receiver connected with the container above the screen, a water heater and circulating pipes connecting the heater with the container and the receiver.

5. An apparatus for extracting wax comprising a container provided with a cover and a screen therebelow, a receiver having a draw off valve between its ends, a pipe connecting the upper end of the container with said receiver above said valve, and means for circulating hot water through the container and receiver.

E. C. SMITH.
ALBERT WATERHOUSE.

Witnesses:
H. T. HAYLDAIN,
E. B. EVANS.